Figure 1:
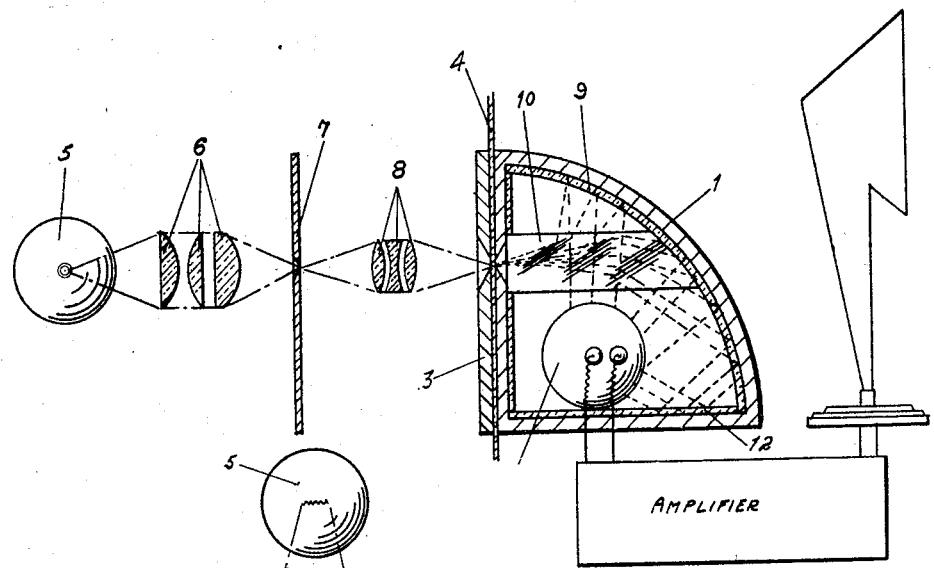

June 30, 1931.  F. H. OWENS  1,812,303

SOUND REPRODUCING MEANS

Filed April 23, 1929

INVENTOR.
FREEMAN H. OWENS.
BY Philip S. Hopkins
ATTORNEY

Patented June 30, 1931

1,812,303

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

SOUND REPRODUCING MEANS

Application filed April 23, 1929. Serial No. 357,591.

This invention relates to improvements in sound reproducing means, and more particularly to that form of means in which an elongated light-sensitive element is used for translating modulated light rays into electrical impulses, the principal object of the invention being to provide means for spreading the light rays during their passage to the light-sensitive element so that they will enter said element over substantially its entire length, thus producing a maximum volume of reproduced sound.

Other objects and advantages of the invention will appear as the description proceeds.

Figure 2:
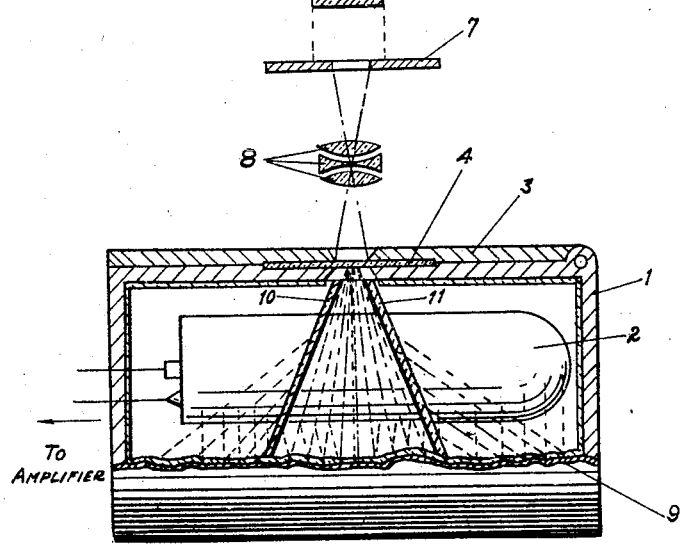

In the drawings accompanying this specification,

Fig. 1 is a somewhat diagrammatic sectional side view of an apparatus embodying the features of the present invention; and Fig. 2 is a sectional plan view thereof.

The same characters of reference designate the same parts in both figures of the drawings.

Referring to the drawings, 1 designates a closed housing within which is disposed an elongated light-sensitive element such as a photo-electric cell 2, the front of the housing being provided with the usual slit gate 3 for supporting and guiding a travelling film 4 having a photographic sound record thereon. The usual light projecting means is illustrated in the drawing and comprises a lamp 5, a condensing lens system 6 disposed in position to collect the light rays from said lamp and project them through a narrow slit formed in a partition 7 on to a focusing lens system 8, by which the areal image of the slit is focused upon the film 4 as it passes the opening in the gate 3.

In order efficiently to cause the modulated light rays as they pass into the housing to enter the light-sensitive element substantially throughout its length, I have provided within the housing a mirror or reflecting surface 9 disposed angularly in the path of the modulated light rays as they come from the film sound record, said mirror extending parallel with the light-sensitive element, whereby all of the rays which strike the mirror will thereby be reflected directly into the light-sensitive element. In order efficiently to spread the rays beyond that area of the mirror on which the rays would normally be projected, I have provided a pair of reflecting spreaders 10 and 11 in the form of partitions extending from front to rear of the housing in divergent relation to each other, the outer surfaces of said partitions, that is to say, those surfaces nearest the end wall of the housing, being mirrors or reflecting surfaces. The front converging ends of these partitions are disposed somewhat within the opening in the front wall of the housing so as to intercept some of the light rays entering the housing through said openings and cause such diverted rays to strike the reflecting surfaces of the partitions whereby the rays will be deflected or spread lengthwise of the housing in the manner indicated by the broken lines in Fig. 2, so as to strike the mirror 9 over a longitudinal area beyond that which would be reached by the rays if they were allowed to follow their normal path. It will thus be seen that the aggregate longitudinal distance over which the mirror 9 is struck by the light rays which pass between the partitions plus those which pass to the outer mirrors of said partitions, corresponds to substantially the length of the elongated photo-electric cell 2 so that the latter receives the modulated light rays over substantially its entire length instead of having them concentrated at a comparatively small portion thereof. The bottom of the housing 1 may also be provided with a reflecting surface 12, whereby any rays which are reflected downward and beyond the photo-electric cell 2 will strike said reflecting surface 12 and thereby be reflected toward the cell 2, as indicated in Fig. 1. The photo-electric cell is shown electrically connected with an amplifier 13 and loud speaker 14 for amplifying and rendering audible the electrical impulses produced by the photo-electric cell.

Having thus described my invention, what I claim is:

1. A sound-reproducing apparatus, including in combination a closed housing having an opening for the admission of light, means for supporting a travelling film carrying a photographic sound record adjacent to said opening, means for projecting light rays into said housing through said opening and sound record, an elongated light-sensitive element disposed in said housing out of the path of said rays, and reflecting means disposed in the path of said projected rays and adapted to reflect them on to said light-sensitive element over susbtantially the entire length thereof.

2. A sound-reproducing apparatus, including in combination a closed housing having an opening for the admission of light, means for supporting a travelling film carrying a photographic sound record adjacent to said opening, means for projecting light rays into said housing through said opening and sound record, an elongated light-sensitive element disposed in said housing out of the path of said rays, an angularly disposed reflecting surface in the path of said projected rays and adapted to reflect them toward said light-sensitive element, and reflecting surfaces disposed in said housing in position to intercept some of said projected rays and divert them to an area in the length of said angularly disposed reflecting surface out of the normal path of the rays.

In testimony whereof, I affix signature.

FREEMAN H. OWENS.